Patented Nov. 1, 1949

2,486,738

UNITED STATES PATENT OFFICE 2,486,738

RECTIFICATION AND STABILIZATION OF FURFURYL ALCOHOL

Eduard Farber, Washington, D. C.

No Drawing. Application January 29, 1946, Serial No. 644,191

3 Claims. (Cl. 202—57)

This invention relates to the rectification and stabilization of furfuryl alcohol.

The present process was disclosed and claimed initially in my copending application Serial No. 519,952, filed January 27, 1944 now Patent 2,445,137 granted July 13, 1948, of which this application is a continuation-in-part.

Generally speaking, commercial furfuryl alcohol is of a rather light color when newly made, but darkens with age. As a result the usual commercial furfuryl alcohol is of a rather dark color, and shows some variations depending upon its age and possibly upon some unknown impurities which seem to form or make their presence manifest during storage. In general, the older the alcohol, the darker its color. Also in certain instances at least, newly made furfuryl alcohol seems to be more active, chemically, than the aged alcohol. As a result the initial light alcohol is preferred generally to the darker aged product.

My present invention provides a process which, when applied to the light or newly made furfuryl alcohol, tends to stabilize the alcohol so that it retains its light active condition during storage, and when applied to aged and darkened furfuryl alcohol, tends both to restore it to its initial light color and activity, and to stabilize it in its latter condition.

According to the invention alkali is mixed with the alcohol and the mixture distilled. The distillate, or at least that following the very first part of it, is the stabilized, or rectified and stabilized, product. Only small quantities of alkali are required. Almost as little as a trace is sufficient where the alcohol has not become too dark and does not contain too many impurities, e. g. 0.2 (two-tenths) of a gram of sodium hydroxide is sufficient for 1000 (one thousand) grams of the alcohol at times. Quite generally 0.4 (four-tenths) of a gram of sodium hydroxide is sufficient for the same quantity of alcohol. From about 0.5 (five-tenths) of a gram to 5 (five) grams of sodium hydroxide is adequate generally to stabilize, or rectify and stabilize, 1000 (one thousand) grams of furfuryl alcohol under all conditions. The invention is not limited to the use of sodium hydroxide however, but other alkaline substances can be used also as previously indicated. The distilling can be done under atmospheric pressure, although distillation under reduced pressure yields substantially the same results.

As an example, mix 1000 grams of commercial furfuryl alcohol, either freshly made or aged and dark, with a solution of from about 1 to about 10 cubic centimeters of water and from about 0.5 (five-tenths) to about 5 grams of sodium hydroxide (NaOH), and then distill the mixture. The sodium hydroxide is dissolved in water only as a convenient means for distributing the alkali through the alcohol; accordingly the quantity of water can be varied considerably. The first small part of the distillate (it may be only a few drops) contains water, and I discard it. The remainder of the distillate is, apparently, substantially pure furfuryl alcohol; it is of a light yellow color that remains unchanged even after rather long storage, is practically unaffected by light and air, and after long storage is more active chemically, at least in some reactions, than common untreated furfuryl alcohol of similar age. Ordinarily light and air tend to darken commercial furfuryl alcohol. In the foregoing respects at least the alcohol so treated is more stable than the untreated product.

I claim:

1. The method of purifying furfuryl alcohol containing impurities which on standing cause the furfuryl alcohol to darken, consisting in adding alkali to the furfuryl alcohol and thereafter distilling the same in the presence of the alkali.

2. The method of purifying furfuryl alcohol containing impurities which on standing cause the furfuryl alcohol to darken, which consists in adding alkali to the furfuryl alcohol in the proportions of from about five-tenths of a part to five parts of the alkali to one thousand parts of the alcohol and thereafter distilling the same in the presence of the alkali.

3. The subject matter of claim 2, characterized by the fact that prior to adding the alkali to the alcohol, the alkali is dissolved in water and this solution is added to the alcohol.

EDUARD FARBER.

REFERENCES CITED

The following references are of record in the file of this patent:

UNITED STATES PATENTS

| Number | Name | Date |
|---|---|---|
| Re. 21,727 | Rodenbers | Feb. 25, 1941 |
| 1,833,331 | Park | Nov. 21, 1931 |
| 1,873,006 | Marley | Aug. 23, 1932 |
| 2,052,743 | Bibb | Sept. 1, 1936 |
| 2,139,179 | Tulleners | Dec. 6, 1936 |